United States Patent
Das et al.

(10) Patent No.: US 10,963,413 B2
(45) Date of Patent: Mar. 30, 2021

(54) METHOD AND SYSTEM FOR TRANSMITTING DATA USING SMALL COMPUTER SYSTEM INTERFACE (SCSI)

(71) Applicant: WIPRO LIMITED, Bangalore (IN)

(72) Inventors: Rishav Das, Howrah (IN); Sourav Mudi, Madhabdihi (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/225,468

(22) Filed: Dec. 19, 2018

(65) Prior Publication Data

US 2020/0142850 A1 May 7, 2020

(30) Foreign Application Priority Data

Nov. 2, 2018 (IN) .............................. 201841041630

(51) Int. Cl.
*G06F 13/40* (2006.01)
*G06F 12/02* (2006.01)
(Continued)

(52) U.S. Cl.
CPC ........ *G06F 13/404* (2013.01); *G06F 12/0246* (2013.01); *G06F 12/0866* (2013.01);
(Continued)

(58) Field of Classification Search
CPC .............. G06F 13/404; G06F 12/0246; G06F 12/0866; G06F 13/4022; G06F 13/4045;
(Continued)

(56) References Cited

U.S. PATENT DOCUMENTS

2006/0080671 A1* 4/2006 Day ...................... G06F 13/387
719/314
2007/0220204 A1* 9/2007 Nakajima ............. G06F 3/0607
711/114
(Continued)

FOREIGN PATENT DOCUMENTS

| CN | 1971497 A | 5/2007 |
| CN | 102567211 A | 7/2012 |

(Continued)

OTHER PUBLICATIONS

Extended European Search Report issued in the European Patent Office in counterpart European Application No. 18248039.2 dated Jun. 18, 2019, 9 pages.

*Primary Examiner* — Tim T Vo
*Assistant Examiner* — Harry Z Wang
(74) *Attorney, Agent, or Firm* — Finnegan, Henderson, Farabow, Garrett & Dunner, LLP

(57) ABSTRACT

Disclosed herein is a method and Serially Attached SCSI (SAS) controller for transmitting data using SCSI. In an embodiment, a plurality of I/O operations received from a storage unit are fragmented into a plurality of blocks. Further, each of the plurality of blocks are mapped with corresponding memory drives. Thereafter, a reduced number of virtual lanes required for transmitting the plurality of blocks to the corresponding memory drives is estimated. Finally, the reduced number of virtual lanes are created for transmitting the plurality of blocks to the corresponding memory drives. In an embodiment, the present disclosure uses virtual lanes for transmitting data, thereby eliminating requirement of dedicated, physical lanes for transmitting the data. Consequently, according to embodiments of present disclosure, the SAS controller may be configured to simultaneously activate multiple virtual lanes for completing the (Continued)

data transmission, thereby resulting in faster and reliable data transmission.

11 Claims, 6 Drawing Sheets

(51) Int. Cl.
  *G06F 12/0866* (2016.01)
  *G06F 13/42* (2006.01)
(52) U.S. Cl.
  CPC ...... *G06F 13/4022* (2013.01); *G06F 13/4045* (2013.01); *G06F 13/4221* (2013.01); *G06F 2212/7201* (2013.01); *G06F 2213/0028* (2013.01); *G06F 2213/0036* (2013.01); *G06F 2213/0058* (2013.01)
(58) Field of Classification Search
  CPC ......... G06F 13/4221; G06F 2212/7201; G06F 2213/0028; G06F 2213/0036; G06F 2213/0058
  See application file for complete search history.

(56) References Cited

U.S. PATENT DOCUMENTS

| | | | |
|---|---|---|---|
| 2012/0072644 A1* | 3/2012 | Asano | G06F 12/0246 711/103 |
| 2012/0239853 A1* | 9/2012 | Moshayedi | G06F 11/1441 711/103 |
| 2013/0311719 A1 | 11/2013 | Doedline, Jr. et al. | |
| 2014/0195731 A1 | 7/2014 | Rajasekaran et al. | |
| 2016/0026542 A1* | 1/2016 | Vasseur | G06F 11/1464 714/4.11 |
| 2019/0042110 A1* | 2/2019 | Bharadwaj | G06F 13/4022 |

FOREIGN PATENT DOCUMENTS

| | | |
|---|---|---|
| CN | 105808158 A | 7/2016 |
| EP | 1837750 A2 | 9/2007 |
| EP | 3382560 A1 | 10/2018 |

\* cited by examiner

METHOD AND SYSTEM FOR TRANSMITTING DATA USING SMALL COMPUTER SYSTEM INTERFACE (SCSI)

TECHNICAL FIELD

The present subject matter is, in general, related to data transmission and more particularly, but not exclusively, to a method and system for transmitting data using Small Computer System Interface (SCSI).

BACKGROUND

Generally, enterprise storage architectures use Serially Attached Small Computer System interface (SAS) expanders to connect multiple memory drives to a reduced number of storage controllers. In general, each storage architecture will have two or more SAS expanders to ensure redundancy in case of failures. Further, each SAS expander may have multiple SAS expander lanes, which connect to the memory drives for propagating data blocks from the storage controllers to the memory drives. Further, each SAS expander is associated with a cache, which is used to temporarily store the data blocks when the lanes are unavailable. However, if the cache space gets filled up, the data blocks will not be processed for propagation and, in turn, processor computation cycle experiences latency due to unprocessed data blocks.

Further, one of the major problems with existing storage architectures is that, a single memory drive may connect to a maximum of two expander lanes due to hardware constraints associated with the memory drives. As a result, availability of the memory drives is highly limited. Consequently, availability of the SAS expander lanes connected to the memory drives is also limited. That is, suppose if there are 12 expander lanes, out of which only 6 expander lanes are used by a particular device, the remaining 6 expander lanes may also be considered to be used during a computational cycle.

Additionally, in the existing SAS expanders, when a problem arises in one of the expander lanes, the entire SAS expander is discarded. As a result, there is an increase of costs in terms of additional SAS expanders and associated hardware resources required.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for transmitting data using Small Computer System Interface (SCSI). The method comprises receiving, by a Serially Attached SCSI (SAS) controller, a plurality of Input/Output (I/O) operations related to transmission of data from a storage unit. Further, the method comprises fragmenting each of the plurality of I/O operations into a plurality of blocks based on size of each of the plurality of I/O operations. The plurality of blocks is stored in a cache memory associated with the SAS controller along with a corresponding logical memory address. Upon fragmenting each of the plurality of I/O operations, the method comprises mapping the corresponding logical memory address of each of the plurality of blocks with a corresponding physical memory address of one or more memory drives for storing the plurality of blocks. The mapping is based on metadata associated with each of the plurality of blocks. After fragmenting each of the plurality of I/O operations, the method comprises estimating a reduced number of virtual lanes required for transmitting the plurality of blocks to corresponding one or more memory drives based on analysis of one or more transmission parameters using predetermined analysis techniques. Finally, the method comprises creating the reduced number of virtual lanes for transmitting each of the plurality of blocks to the one or more memory drives.

Further, the present disclosure relates to a Serially Attached Small Computer System Interface (SAS) controller for transmitting data using Small Computer System Interface (SCSI). The SAS controller comprises a processor and a memory. The memory is communicatively coupled to the processor and stores processor-executable instructions, which on execution, cause the processor to receive a plurality of Input/Output (I/O) operations related to transmission of data from a storage unit. Further, the processor fragments each of the plurality of I/O operations into a plurality of blocks based on size of each of the plurality of I/O operations. Each of the plurality of blocks are stored in a cache memory associated with the SAS controller along with a corresponding logical memory address. Upon fragmenting each of the plurality of I/O operations, the processor maps the corresponding logical memory address of each of the plurality of blocks with a corresponding physical memory address of one or more memory drives for storing the plurality of blocks. The mapping is based on metadata associated with each of the plurality of blocks. Furthermore, the processor estimates a reduced number of virtual lanes required for transmitting the plurality of blocks to corresponding one or more memory drives based on analysis of one or more transmission parameters, using predetermined analysis techniques. Finally, the processor creates the reduced number of virtual lanes for transmitting each of the plurality of blocks to the one or more memory drives.

Furthermore, the present disclosure relates to a non-transitory computer readable medium including instructions stored thereon that when processed by at least one processor cause a Serially Attached Small Computer System Interface (SAS) controller to perform operations comprising receiving a plurality of Input/Output (I/O) operations, related to transmission of data, from a storage unit. Further, the instructions cause the SAS controller to fragment each of the plurality of I/O operations into a plurality of blocks based on size of each of the plurality of I/O operations, wherein each of the plurality of blocks are stored in a cache memory, associated with the SAS controller, along with a corresponding logical memory address. Subsequently, the instructions cause the SAS controller to map the corresponding logical memory address of each of the plurality of blocks with a corresponding physical memory address of one or more memory drives for storing the plurality of blocks. The mapping is based on metadata associated with each of the plurality of blocks. Thereafter, the instructions cause the SAS controller to estimate a reduced number of virtual lanes required for transmitting the plurality of blocks to the corresponding one or more memory drives based on analysis of one or more transmission parameters using predetermined analysis techniques. Finally, the instructions cause the SAS controller to create the reduced number of virtual lanes for transmitting each of the plurality of blocks to the one or more memory drives.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1A:
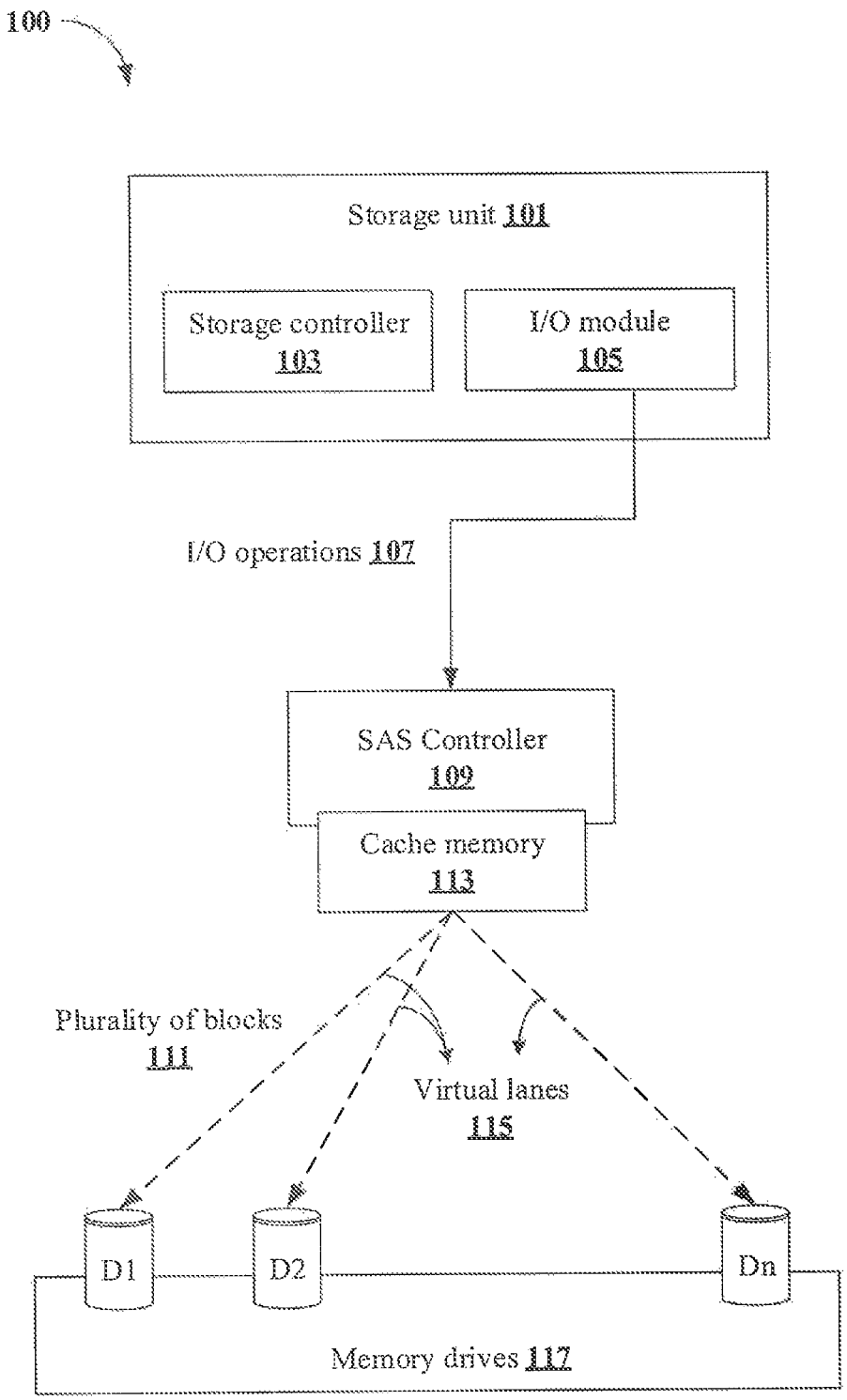
FIG. 1A illustrates an exemplary environment for transmitting data using Small Computer System Interface (SCSI) in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure discloses a method and a Serially Attached Small Computer System Interface (SAS) controller for transmitting data using the SCSI. The proposed method uses virtualization techniques to create virtual lanes between the SAS controller and one or more memory drives. Thus, the proposed method eliminates physical lanes between the SAS controller and the one or more memory drives, thereby eliminating issues associated with physical lanes. Further, the proposed method uses deep learning techniques to reduce number of virtual lanes between the SAS controller and the memory drives and completes data transmission using a minimum number of virtual lanes. Additionally, the proposed method ensures that the virtual lanes get back to a passive state upon completing the data transmission, thereby reducing computational cycle of the SAS controller.

In other words, the proposed method provides a new internal layer that eliminates need for creating dedicated lanes for the data transmission. The virtualization of lanes may also help in reducing cost of physical lanes, congestion and latency in the data transmission. Also, the proposed method discloses enhancing/increasing buffer strength of the SAS controller to prevent any failures due to overflow of the buffer space. The proposed method may also find its application in cloud infrastructure service to reduce latency and to design an efficient computation standpoint.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1A illustrates an exemplary environment 100 for transmitting data using Small Computer System Interface (SCSI) in accordance with some embodiments of the present disclosure.

In some implementations, the environment 100 may include a storage unit 101, a Serially Attached SCSI Controller 109, a cache memory 113 and one or more memory drives 117. In an embodiment, the storage unit 101 may be a temporary storage, or a permanent storage used by a computing device for storing various data and instructions. Additionally, the storage unit 101 may be an external storage such as a cloud storage, which may be accessed by a connected computing device for storing and/or retrieving various data and instructions.

In an implementation, the storage unit 101 may include, without limiting to, a storage controller 103 and an Input/Output (I/O) module 105. In an embodiment, the storage controller 103 may be configured for controlling and monitoring memory operations performed on the storage unit 101. Further, the storage controller 103 may be configured for performing actions including, without limiting to, propagating a plurality of I/O operations 107 generated in the storage unit 101, managing clusters of memory, managing data protection entities such as Redundant Array of Independent Disks (RAID) cards and managing all hardware resources of the storage unit 101. The I/O module 105 may be configured for transmitting the plurality of I/O operations 107 generated at the storage unit 101 to the SAS controller 109.

In an embodiment, the SAS controller 109 may be used for transmitting the plurality of I/O Operations 107 generated at the storage unit 101 to the one or more memory drives 117. In an embodiment, the one or more memory drives 117 may include a plurality of disk drives namely, disk drive D1 to disk drive Dn as shown in FIG. 1A. Further, each of the drives D1-Dn may be associated with a unique physical memory address.

In an embodiment, upon receiving the plurality of I/O operations 107 from the storage unit 101, the SAS controller 109 may fragment the plurality of I/O operations 107 into a plurality of blocks 111 based on size of the plurality of I/O operations 107. Subsequently, the SAS controller 109 may temporarily store each of the plurality of blocks 111 in a cache memory 113 associated with the SAS controller 109. Further, each of the plurality of blocks 111 stored in the cache memory 113 may be assigned with a unique logical memory address.

In an embodiment, upon storing the plurality of blocks 111 in the cache memory 113, the SAS controller 109 may map logical memory address of each of the plurality of blocks 111 with a corresponding physical memory address of one or more memory drives 117 to identify the one or more memory drives 117 in which the plurality of blocks 111 may be stored. In an embodiment, the mapping of the logical memory address and the physical memory address may be performed based on metadata associated with each of the plurality of blocks 111. As an example, the metadata may be a destination memory address for storing each of the plurality of blocks 111. That is, the mapping may be performed by verifying a destination physical memory address of each of the plurality of blocks 111. In an embodiment, the SAS controller 109 may establish a communication with the one or more memory drives 117 by creating one or more virtual lanes 115 between the SAS and the one or more memory drives 117.

In an embodiment, upon mapping the logical memory addresses to the corresponding physical memory addresses, the SAS controller 109 may estimate a reduced number of virtual lanes 115 required for transmitting the plurality of blocks 111 to the corresponding one or more memory drives 117. In an implementation, the estimation of the reduced number of virtual lanes 115 may be performed by analysing one or more transmission parameters associated with the transmission of data using predetermined analysis techniques. As an example, the one or more transmission parameters may include, without limiting to, size of each of the plurality of blocks 111, transmission speed in the virtual lanes 115, and number of the plurality of I/O operations 107 waiting in the cache memory 113. Further, the predetermined analysis technique may include, without limiting to, at least one of linear regression analysis, multi-linear regression analysis and logistic regression analysis. In an embodiment, the reduced number of virtual lanes 115 may correspond to a least number of the virtual lanes 115 that may be required for completing transmission of each of the plurality of blocks 111 to corresponding one or more memory drives 117.

In an embodiment, once the reduced number of virtual lanes 115 is estimated, the SAS controller 109 may create the reduced number of virtual lanes 115 for transmitting each of the plurality of blocks 111 to the one or more memory drives 117. In an embodiment, before transmitting the plurality of blocks 111 through the virtual lanes 115, the SAS controller 109 may group the plurality of blocks 111 into one or more clusters based on the corresponding physical memory address mapped to the plurality of blocks 111. That is, two or more of the plurality of blocks 111 which are mapped to the same physical memory address may be grouped into a single cluster and transmitted simultaneously over a single virtual lane. Thus, grouping the plurality of blocks 111 helps in faster data transmission, and reducing the number of virtual lanes 115 required for transmitting each of the plurality of blocks 111. In an embodiment, upon completing transmission of each of the plurality of blocks 111, the SAS controller 109 may move all the virtual lanes 115 into a passive state. That is, the virtual lanes 115 may remain in an inactive state until there are new I/O operations 107 pending for transmission.

Figure 1B:
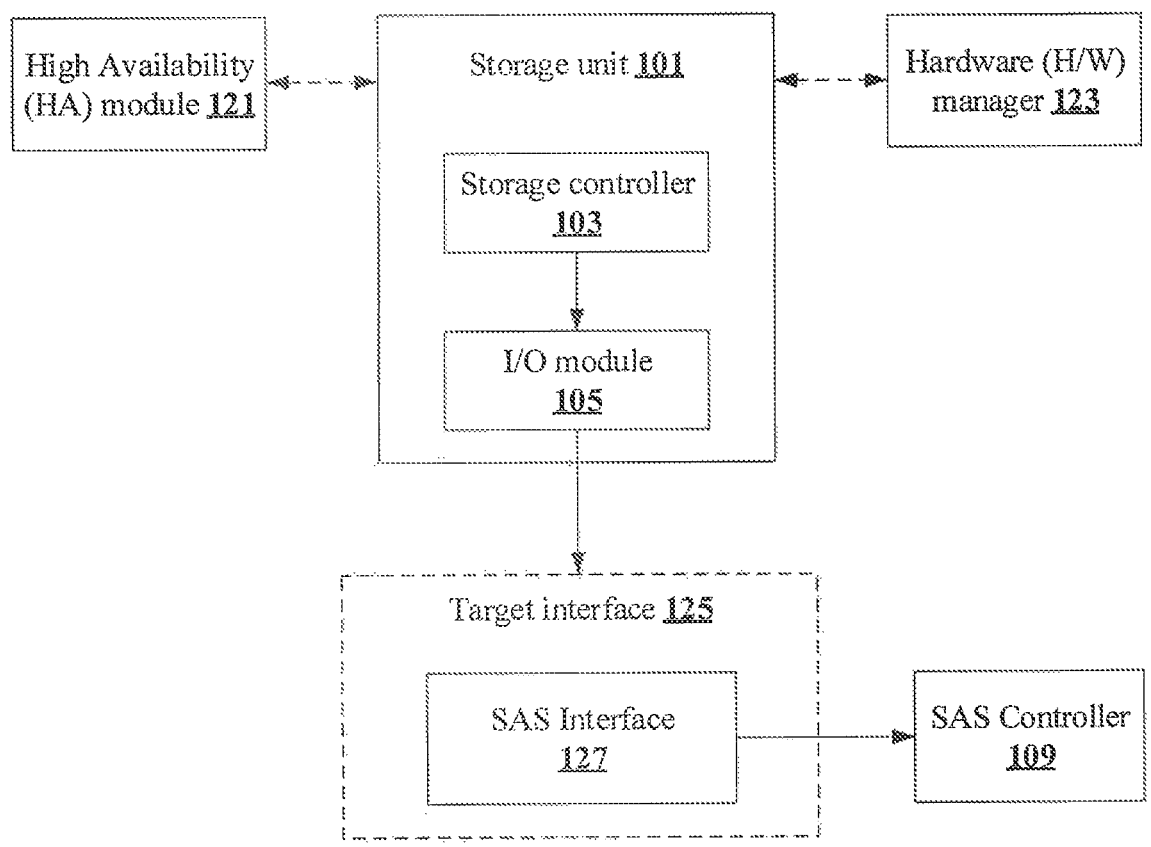
FIG. 1B illustrates architecture of a storage unit in accordance with some embodiments of the present disclosure.

FIG. 1B illustrates architecture of the storage unit 101. In an embodiment, the storage unit 101 may be associated with a High Availability (HA) module 121 and a Hardware (H/W) manager 123. The HA module 121 may be configured to monitor health of the storage unit 101, the storage controller 103 and drive enclosures of the storage unit 101. The HA module 121 may ensure that each memory cluster of the storage unit 101 is in an active state at all the time. Further, at every failed instance, the HA module 121 may collect log information of the failure for a better monitoring of the storage unit 101. In an embodiment, the H/W manager 123 may be configured to monitor working of all hardware components such as the storage controller 103, the drive enclosures and any additional part of the storage unit 101. During a failure, the H/W manager 123 may immediately invoke kernel and related diagnostic processes to diagnose a faulty component that has caused the failure event. Further, the H/W module may also notify the HA module 121 about the failure event, so that other passive components or active redundant components may be activated to takeover functions of the faulty component.

In an embodiment, the storage controller 103 may be configured to manage all incoming and outgoing I/O operations in the storage unit 101. The storage controller 103 may be also responsible for managing clusters of memories shared among multiple storage unit 101 and managing data protection within the storage unit 101. Moreover, the storage controller 103 may be associated with various sensors to manipulate cooling of the storage unit 101. The I/O module 105 may be configured to transform the plurality of I/O operations 107 into smaller blocks and then align each block to a respective memory drive.

Further, the storage unit 101 may be connected to a plurality of target interface 125 to facilitate transmission of the data and/or the plurality of I/O operations 107 between the storage unit 101 and one or more memory drives 117. As an example, the plurality of target interface 125 may include, without limiting to, data transmission interfaces such as Fiber Channel (FC), Ethernet cables, SCSI or SAS interface 127. Since embodiments of the present disclosure are related to transmitting data using SCSI, the target interface 125 may be SAS interface 127, which is coupled to the SAS controller 109. Subsequently, the SAS controller 109 may complete the transmission of data as per the illustration provided in FIG. 1A.

Figure 2A:
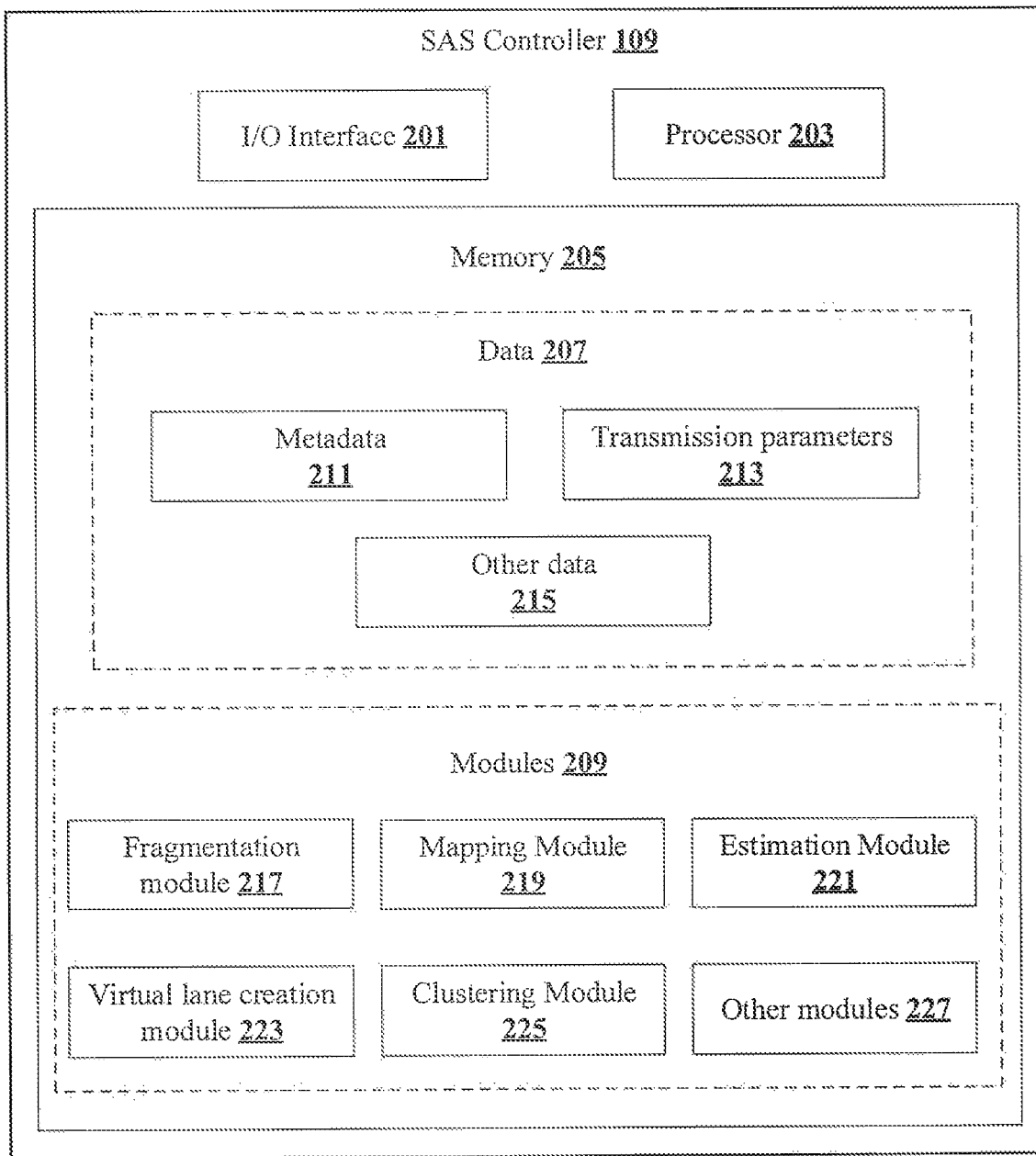
FIG. 2A shows a detailed block diagram illustrating a Serially Attached SCSI (SAS) controller in accordance with some embodiments of the present disclosure.

FIG. 2A shows a detailed block diagram illustrating a Serially Attached SCSI (SAS) controller in accordance with some embodiments of the present disclosure.

In some implementations, the SAS controller 109 may include an I/O interface 201, a processor 203, and a memory 205. The I/O interface 201 may be configured to communicate with a storage unit 101 to receive a plurality of Input/Output (I/O) operations related to transmission of data. The memory 205 may be communicatively coupled to the processor 203 and may store data 207 and one or more modules 209. The processor 203 may be configured to perform one or more functions of the SAS controller 109 while transmitting the plurality of I/O operations 107 received from the storage unit 101 to one or more memory drives 117.

In an embodiment, the processor 203 and the memory 205 may be a part of a storage controller 103 or any computational unit associated with the storage unit 101. Further, various hardware modules such as Redundant Array of Independent Disks (RAID) controller cards, SAS cards and target ports of the one or more memory drives 117 may be integrated and operated through the processor 203. Additionally, information like temperature of the storage unit 101, mother board sensors information, cooling system information and Light Emitting Diode (LED) sequencing information may be stored in the memory 205 and managed by the processor 203 according to a set of operations performed on the storage unit 101 during any computational cycle.

In an embodiment, the data 207 may include, without limitation, metadata 211, transmission parameters 213 and other data 215. In some implementations, the data 207 may be stored within the memory 205 in the form of various data structures. Additionally, the data 207 may be organized using data models, such as relational or hierarchical data models. The other data 215 may store various temporary data and files generated by one or more modules 209 while performing various functions of the SAS controller 109. As an example, the other data 215 may include a plurality of blocks 111 formed by fragmenting the plurality of I/O operations 107, logical memory address of the plurality of blocks 111, physical memory address of the one or more drives, information related to one or more clusters of the plurality of blocks 111 and the like.

In an embodiment, the metadata 211 associated with each of the plurality of blocks 111 may include, without limiting to, a destination memory address for storing each of the plurality of blocks 111. As an example, the destination memory address may be the physical memory address of the one or more memory drives 117 corresponding to the plurality of blocks 111. In an embodiment, the metadata 211 may be used for mapping the logical memory address of each of the plurality of blocks 111 with a corresponding physical memory address of one or more memory drives 117 for storing the plurality of blocks 111.

In an embodiment, the one or more transmission parameters 213 may be used for estimating a reduced number of the virtual lanes 115 required for transmitting the plurality of blocks 111 to the corresponding one or more memory drives 117. As an example, the one or more transmission parameters 213 may include, without limiting to, size of each of the plurality of blocks 111, transmission speed in the virtual lanes 115, and number of the plurality of I/O operations 107 pending for the transmission.

In an embodiment, each of the data 207 may be processed by the one or more modules 209. In some implementations, the one or more modules 209 may be communicatively coupled to the processor 203 for performing one or more functions 103 of the SAS controller 109. In an implementation, the one or more modules 209 may include, without limiting to, a fragmentation module 217, a mapping module 219, an estimation module 221, a virtual lane creation module 223, a clustering module 225 and other modules 227.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. In an embodiment, the other modules 227 may be used to perform various miscellaneous functionalities of the SAS controller 109. It will be appreciated that such one or more modules 209 may be represented as a single module or a combination of different modules.

In an embodiment, the fragmentation module 217 may be configured for fragmenting each of the plurality of I/O operations 107 into a plurality of blocks 111 based on size of each of the plurality of I/O operations 107. That is, the fragmentation module 217 may identify the plurality of I/O operations 107 whose size is more than a predetermined threshold value and may partition the identified I/O operations 107 into two or more blocks of reduced size. The size of each of the plurality of blocks 111 may be varied depending on vendor-specific configurations and architecture of the storage unit 101.

In an embodiment, upon fragmenting the plurality of I/O operations 107 into the plurality of blocks 111, each of the plurality of blocks 111 may be temporarily stored in a cache memory 113 associated with the SAS controller 109, before dispatching the plurality of blocks 111 for transmission. Also, each of the plurality of blocks 111 may be assigned with a unique logical memory address in the cache memory 113. In an embodiment, storing the plurality of blocks 111 in the cache memory 113 may be helpful for retrieving/restoring the plurality of blocks 111 in case of any failures in the data transmission process. As an example, the plurality of blocks 111 may be retrieved using the logical memory address of each of the plurality of blocks 111.

In an embodiment, the mapping module 219 may be configured for mapping the logical memory address of each of the plurality of blocks 111 with a corresponding physical memory address of the one or more memory drives 117 for storing the plurality of blocks 111. In an embodiment, the mapping module 219 may refer the metadata 211 associated with each of the plurality of blocks 111 to identify the destination physical memory address and/or the physical address of the one or more memory drives 117 in which the plurality of blocks 111 must be stored. That is, the mapping module 219 may determine a Logical Unit Number (LUN) and/or physical memory space where the plurality of blocks 111 may be stored. Once the logical memory address and the physical memory address are mapped, the plurality of blocks 111 get ready for transmission.

In an embodiment, the estimation module 221 may be configured for estimating a reduced number of virtual lanes 115 required for transmitting the plurality of blocks 111 to the corresponding one or more memory drives 117. In an embodiment, the estimation module 221 may estimate the reduced number of virtual lanes 115 by analysing the one or more transmission parameters 213, associated with the plurality of blocks 111, using predetermined analysis techniques. As an example, the predetermined analysis techniques may include, without limiting to, linear regression analysis, multi-linear regression analysis and logistic regression analysis.

In an embodiment, the estimation module 221 may initially perform linear regression analysis of the one or more transmission parameters 213, and subsequently perform a logistic regression for estimating the reduced number of virtual lanes 115. A combination of the multi-linear regression and logistic regression may be used to obtain significant values for determining the reduced number virtual lanes 115. For example, the transmission parameters 213 such as transmission speed in the virtual lanes 115, number of blocks pending to be processed, and number of blocks already transmitted may be used to determine a target transmission speed in the virtual lanes 115. Assuming 'Y' is value of target transmission speed, and 'X' is value of associated latency, three values, namely $S_{XX}$, $S_{XY}$, $S_{YY}$ may be computed as shown in equation (1) below:

$$P_{XX}=\text{Sum}(X_2)-n(X_{avg})|P_{YY}=\text{Sum}(Y_2)-n(Y_{avg})$$
$$|P_{XY}=\text{Sum}(X_iY_i)-n(X_{avg}\cdot Y_{avg}) \quad (1)$$

Further, value of slope may be calculated using equation (2) below:

$$\text{Slope(beta)}=P_{XY}/P_{XX} \quad (2)$$

$$\text{Whereas, alpha}=Y_{avg}-\text{Beta}(X) \quad (3)$$

Thereafter, predicted values of parameters may be computed using input values X as shown in equation (4) below:

$$y=\text{alpha}+\text{beta}(X) \quad (4)$$

Where, 'X' is the input values for which 'Y' is the target value of parameter.

In an embodiment, the virtual lane creation module 223 may be configured for creating the reduced number of virtual lanes 115 for transmitting each of the plurality of blocks 111 to the one or more memory drives 117. Additionally, the virtual lane creation module 223 may be configured to deactivate and/or move the virtual lanes 115 into a passive/inactive state upon completion of the data transmission. That is, the virtual lane creation module 223 may dynamically create and/or activate the virtual lanes 115 only when there is at least one block pending for transmission.

In an embodiment, the clustering module 225 may be configured for optimizing transmission of the plurality of blocks 111 to the one or more drives by grouping the plurality of blocks 111 into one or more clusters and then simultaneously transmitting the one or more clusters to the corresponding one or more memory drives 117. In an embodiment, the clustering module 225 may group the plurality of blocks 111 into the one or more clusters based on the physical memory address mapped to the plurality of blocks 111. Subsequently, the clustering module 235 may assign separate virtual lanes 115 for each of the one or more clusters for transmitting the plurality of blocks 111 in the one or more clusters.

Figure 2B:
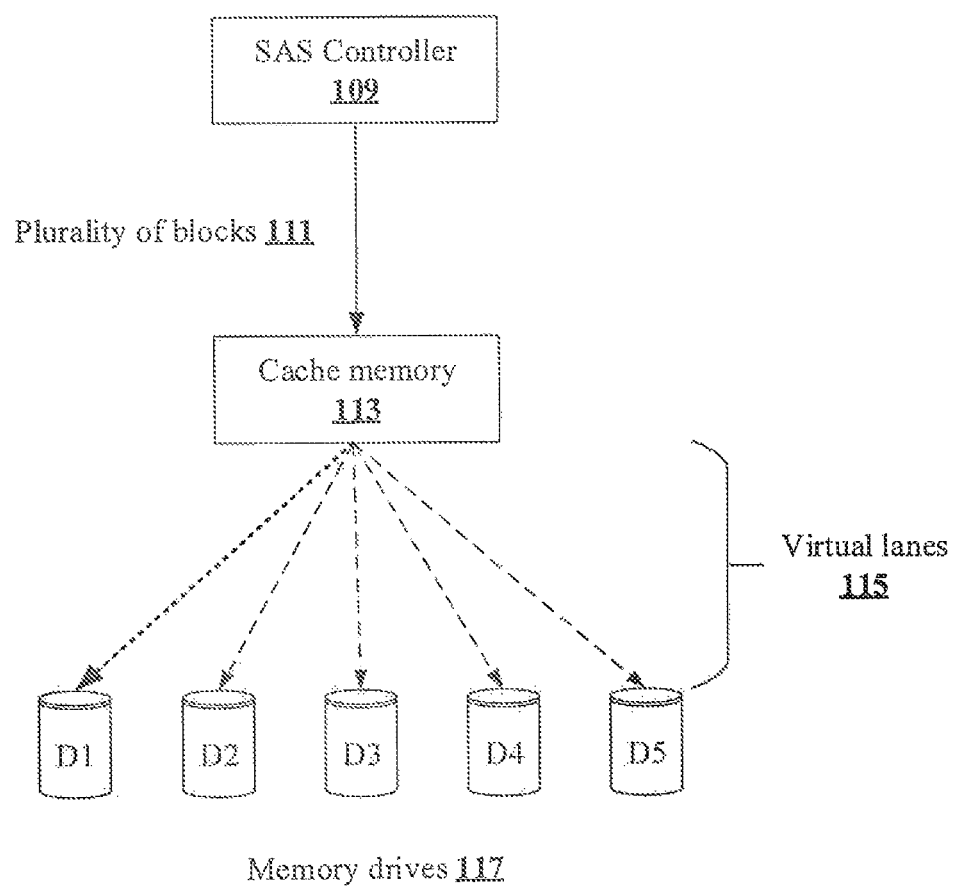
FIG. 2B is an exemplary illustration of transmitting data using virtual lanes in accordance with some embodiments of the present disclosure.

In an embodiment, the SAS controller 109 may function like a N-Port SAS Expander and may help to expand and create any required number of the virtual lanes 115. Creation of the virtual lanes 115 may be performed in the order of '$2^n$'. That is, the number of virtual lanes 115 created by the SAS controller 109 may increase exponentially with increase in number of the memory drives 117. For example, if there are 32 memory drives 117, then a total of $2^5=32$ virtual lanes 115 may be created. Further, as represented in FIG. 2B, each of the virtual lanes 115 may be connected with corresponding memory drives 117, such that each memory drive is attached with at least one virtual lane. Finally, the plurality of blocks 111 may be transmitted to the one or more memory drives 117 using the virtual lanes 115.

Figure 3:
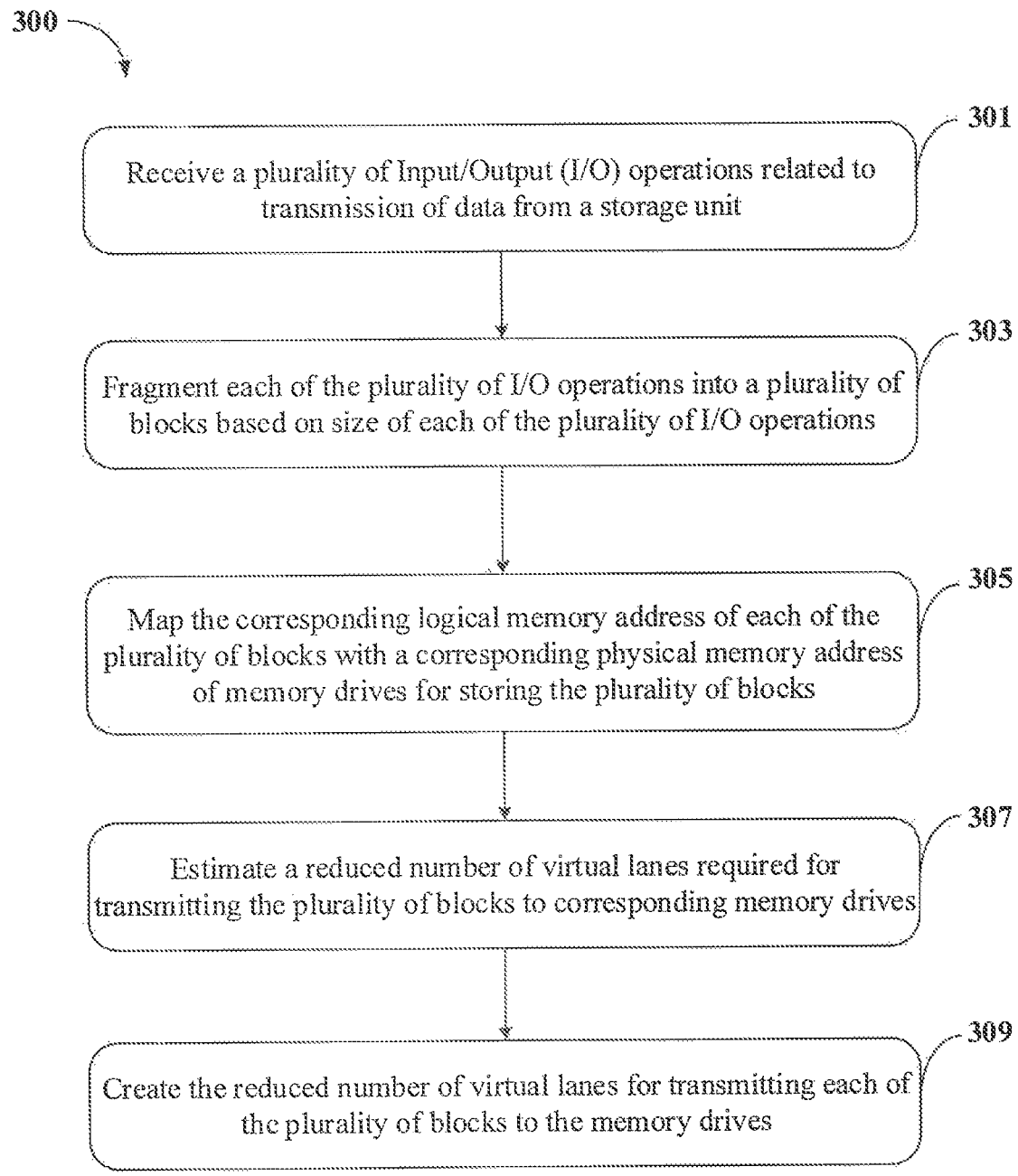
FIG. 3 shows a flowchart illustrating a method of transmitting data using SCSI in accordance with some embodiments of the present disclosure.

FIG. 3 shows a flowchart illustrating a method of transmitting data using SCSI in accordance with some embodiments of the present disclosure.

As illustrated in FIG. 3, the method 300 may include one or more blocks illustrating a method of transmitting data on a Small Computer System interface (SCSI) using a Serially Attached SCSI (SAS) controller 105 shown in FIG. 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 includes receiving, by the SAS controller 109, a plurality of Input/Output (I/O) operations, related to transmission of data, from a storage unit 101. In an embodiment, the plurality of I/O operations 107 may be created when a memory operation is initiated on the storage unit 101.

At block 303, the method 300 includes fragmenting, by the SAS controller 109, each of the plurality of I/O operations 107 into a plurality of blocks 111 based on size of each of the plurality of I/O operations 107. In an embodiment, each of the plurality of blocks 111 may be stored in a cache memory 113, associated with the SAS controller 109, along with a corresponding logical memory address.

At block 305, the method 300 includes mapping, by the SAS controller 109, the logical memory address of each of the plurality of blocks 111 with a corresponding physical memory address of one or more memory drives 117 for storing the plurality of blocks 111. In an embodiment, the mapping may be performed based on metadata 211 associated with each of the plurality of blocks 111. As an example, the metadata 211 associated with each of the plurality of blocks 111 may include, without limiting to, at least one of a destination memory address for storing each of the plurality of blocks 111.

At block 307, the method 300 includes estimating, by the SAS controller 109, a reduced number of virtual lanes 115 required for transmitting the plurality of blocks 111 to corresponding one or more memory drives 117 based on analysis of one or more transmission parameters 213 using predetermined analysis techniques. As an example, the one or more transmission parameters 213 may include, without limiting to, least one of the size of each of the plurality of blocks 111, transmission speed in the virtual lanes 115, and number of the plurality of I/O operations 107 pending for the transmission. Further, the predetermined analysis techniques may include, without limiting to, at least one of linear regression analysis, multi-linear regression analysis and logistic regression analysis.

At block 309, the method 300 includes creating, by the SAS controller 109, the reduced number of virtual lanes 115 for transmitting each of the plurality of blocks 111 to the one or more memory drives 117. In an embodiment, transmitting the plurality of blocks 111 through the virtual lanes 115 may include grouping the plurality of blocks 111 into one or more clusters based on corresponding physical memory address mapped to the plurality of blocks 111 and assigning a virtual lane for each of the one or more clusters for transmitting the plurality of blocks 111 in the one or more clusters. In an embodiment, the virtual lanes 115 may be moved to a passive state upon completing transmission of each of the plurality of blocks 111 to the one or more memory drives 117. Further, the virtual lanes 115 may be re-activated and/or moved to the active state when one or more of the plurality of blocks 111 are pending for transmission.

Computer System

Figure 4:
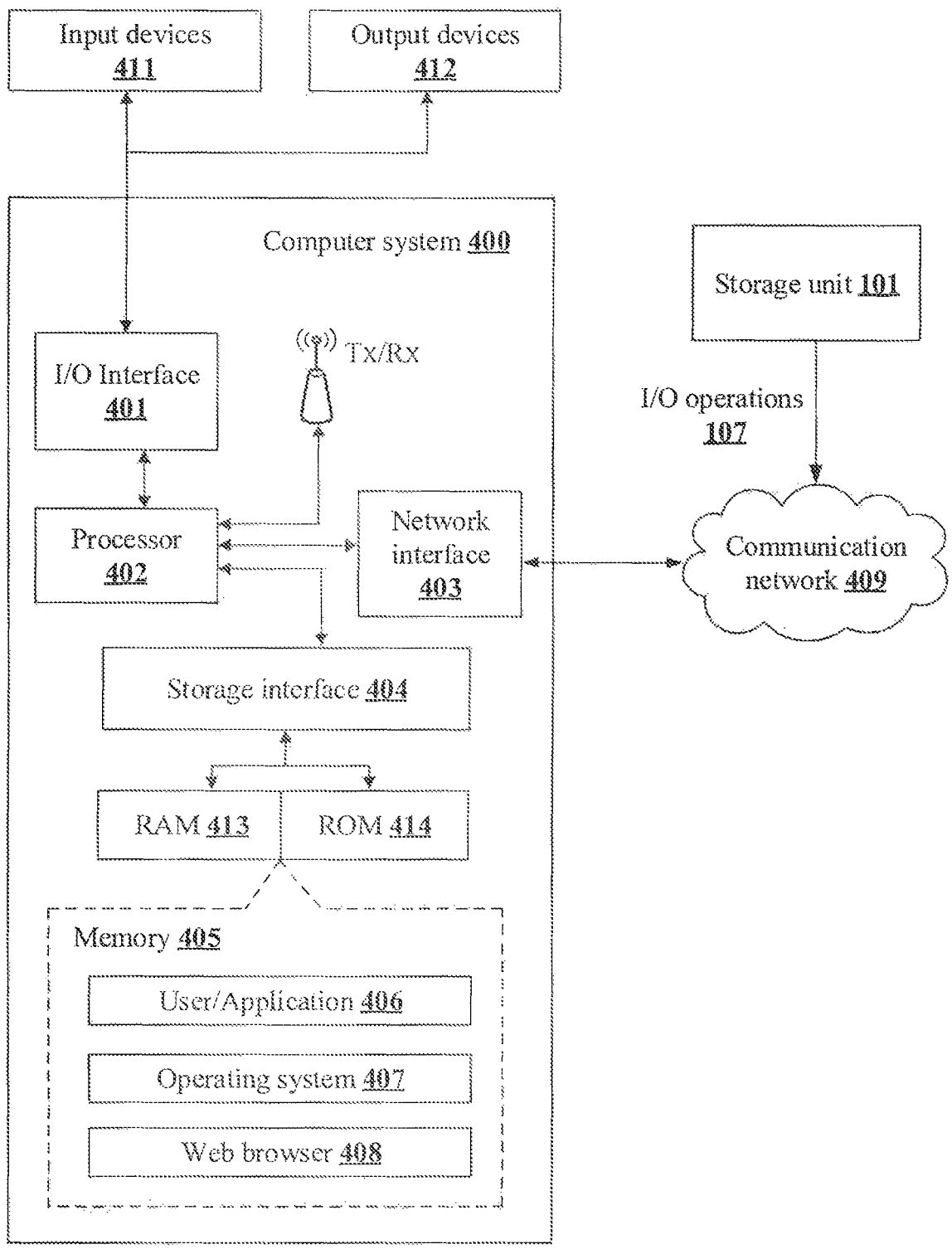
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be a Serially Attached Small Computer System Interface (SAS) controller 105 shown in FIG. 1, which may be used for transmitting data in SCSI. The computer system 400 may include a central processing unit ("CPU" or "processor") 402. The processor 402 may comprise at least one data processor for executing program components for executing user- or system-generated business processes. A user may include a person, a user in the environment 100, or any system/sub-system being operated parallelly to the computer system 400. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE®-1394, serial bus, Universal Serial Bus (USB), infrared, PS/2, BNC, coaxial, component, composite, Digital Visual interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 403 and the communication network 409, the computer system 400 may receive a plurality of Input/Output (I/O) operations 107, related to transmission of data, from a storage unit 101. In an implementation, the storage unit 101 and the computer system 400 may be part of a single computing device. In another implementation, the storage unit 101 may be an external storage unit, such as a cloud storage unit, connected to the computer system 400 through the communication network 409.

In an implementation, the communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/ Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/ application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 406 may facilitate display, execution, interaction, manipulation, or operation of program components through textual or graphical facilities. For example, the user interface 406 may provide computer interaction interface elements on a display system operatively connected to the computer system 400, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 408 may be a hypertext viewing application. Secure web browsing may be provided using Secure Hypertext Transport Protocol (HTTPS), Secure Sockets Layer (SSL), Transport Layer Security (TLS), and the like. The web browsers 408 may utilize facilities such as AJAX, DHTML, ADOBE® FLASH®, JAVASCRIPT®, JAVA®, Application Programming Interfaces (APIs), and the like. Further, the computer system 400 may implement a mail server stored program component. The mail server may utilize facilities such as ASP, ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated herein.

In an embodiment, the present disclosure discloses an optimized method for transmitting data in a Small Computer System Interface.

In an embodiment, the method of present disclosure uses virtual lanes for transmitting data between a storage unit and one or more memory drives, thereby eliminating requirement of using dedicated, physical lanes between the storage unit and the one or more memory drives. Consequently, the method of present disclosure prevents failures associated with the physical lanes and reduces cost of storage architectures, since the physical lanes and associated hardware resources are eliminated.

In an embodiment, the method of present disclosure determines a minimum number of virtual lanes required for the data transmission and activates only the minimum number virtual lanes for the data transmission. As a result, the method of present disclosure makes optimal use of cache/buffer space associated with SAS controller. Further, since the number of virtual lanes is reduced, the present disclosure also helps in reducing computational costs/overheads associated with the data transmission.

In an embodiment, the method of present disclosure allows SAS controller to simultaneously activate multiple virtual lanes for completing the data transmission. Hence, the present disclosure helps in faster and reliable data transmission. Whereas, in the existing storage architecture, each memory drive may connect to a maximum of two lanes only.

In an embodiment, the method of present disclosure reduces latency in the data transmission since the number of virtual lanes are reduced and the virtual lanes are established and activated on demand.

In an embodiment, according to method of present disclosure, any number of virtual lanes may be created and activated with respect to address of a memory drive and SAS logical address. Thus, there may not be any transmission failures at a single point in time.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Environment |
| 101 | Storage unit |
| 103 | Storage controller |
| 105 | I/O module |
| 107 | I/O operations |
| 109 | SAS Controller |
| 111 | Plurality of blocks |
| 113 | Cache memory |
| 115 | Virtual lanes |
| 117 | Memory drives |
| 121 | High Availability (HA) module |
| 123 | Hardware (H/W) manager |
| 125 | Target interlace |
| 127 | SAS interface |
| 201 | I/O interface |
| 203 | Processor |
| 205 | Memory |
| 207 | Data |
| 209 | Modules |
| 211 | Metadata |
| 213 | Transmission parameters |
| 215 | Other data |
| 217 | Fragmentation module |

-continued

| Reference Number | Description |
| --- | --- |
| 219 | Mapping module |
| 221 | Estimation module |
| 223 | Virtual lane creation module |
| 225 | Clustering module |
| 227 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |

What is claimed is:

1. A method of transmitting data using Small Computer System Interface (SCSI), the method comprising:

receiving, by a Serially Attached SCSI (SAS) controller, a plurality of Input/Output (I/O) operations, related to transmission of data, from a storage unit;

fragmenting, by the SAS controller, each of the plurality of I/O operations into a plurality of blocks based on size of each of the plurality of I/O operation, wherein each of the plurality of blocks are stored in a cache memory, associated with the SAS controller, along with a corresponding logical memory address;

mapping, by the SAS controller, the corresponding logical memory address of each of the plurality of blocks with a corresponding physical memory address of one or more memory drives for storing the plurality of blocks, wherein the mapping is based on metadata associated with each of the plurality of blocks;

determining, by the SAS controller, a predicted value of target transmission speed (Y) required by virtual lanes to transmit the plurality of blocks to corresponding one or more memory drives, by performing multi-linear regression on latencies $(X_0\_X_i)$ and transmission speed $(Y_0\_Y_i)$ in the virtual lanes for blocks that are already transmitted, wherein determining the predicted value of target transmission speed (Y) is based on the below equation:

$$Y = \text{alpha} + \text{beta}(X),$$

wherein $$\text{Slope (beta)} = \frac{\text{Sum}(XiYi) - n(Xavg \cdot Yavg)}{\text{Sum}(X2) - n(Xavg)},$$

and $$\text{alpha} = Y_{avg} - \text{beta}(X),$$

wherein the Xavg·Yavg are the averages of X and Y by summing all the values and then dividing by number of values added;

estimating, by the SAS controller, a minimum number of virtual lanes required for transmitting the plurality of blocks to corresponding one or more memory drives by performing a logistic regression analysis on the size of each of the plurality of blocks, the predicted value of transmission speed required by the virtual lanes, and number of the plurality of I/O operations pending for the transmission; and creating, by the SAS controller, the minimum number of virtual lanes for transmitting each of the plurality of blocks to the one or more memory drives, and wherein the plurality of blocks are transmitted through the virtual lanes by grouping the plurality of blocks into one or more clusters based on the corresponding physical memory address mapped to the plurality of blocks.

2. The method as claimed in claim 1, wherein the metadata associated with each of the plurality of blocks comprises at least one of a destination memory address for storing each of the plurality of blocks.

3. The method as claimed in claim 1, wherein the predetermined analysis techniques further comprise linear regression analysis.

4. The method as claimed in claim 1, wherein transmitting the plurality of blocks through the virtual lanes comprises assigning a virtual lane for each of the one or more clusters for transmitting the plurality of blocks in the one or more clusters.

5. The method as claimed in claim 1, wherein the virtual lanes are moved to a passive state upon completing transmission of each of the plurality of blocks.

6. A Serially Attached Small Computer System Interface (SAS) controller for transmitting data using Small Computer System Interface (SCSI), the SAS controller comprising:

a processor; and a memory, communicatively coupled to the processor, wherein the memory stores processor-executable instructions, which on execution, cause the processor to:

receive a plurality of Input/Output (I/O) operations related to transmission of data from a storage unit;

fragment each of the plurality of I/O operations into a plurality of blocks based on size of each of the plurality of I/O operations, wherein each of the plurality of blocks are stored in a cache memory, associated with the SAS controller, along with a corresponding logical memory address;

map the corresponding logical memory address of each of the plurality of blocks with a corresponding physical memory address of one or more memory drives for storing the plurality of blocks, wherein the mapping is based on metadata associated with each of the plurality of blocks;

determining, by the SAS controller, a predicted value of target transmission speed (Y) required by virtual lanes to transmit the plurality of blocks to corresponding one or more memory drives, by performing multi-linear regression on latencies $(X_0\_X_i)$ and transmission speed $(Y_0\_Y_i)$ in the virtual lanes for blocks that are already transmitted, wherein determining the predicted value of target transmission speed (Y) is based on the below equation:

$$Y = \text{alpha} + \text{beta}(X),$$

wherein, $$\text{Slope (beta)} = \frac{\text{Sum}(XiYi) - n(Xavg \cdot Yavg)}{\text{Sum}(X2) - n(Xavg)},$$

and $$\text{alpha} = Y_{avg} - \text{beta}(X),$$

wherein the Xavg·Yavg are the averages of X and Y by summing all the values and then dividing by number of values added;

estimate a minimum number of virtual lanes required for transmitting the plurality of blocks to corresponding one or more memory drives by performing a logistic regression analysis on the size of each of the plurality of blocks, the predicted value of transmission speed required by the virtual lanes, and number of the plurality of I/O operations pending for the transmission; and create the minimum number of virtual lanes for transmitting each of the plurality of blocks to the one or more memory drives, and wherein the plurality of blocks are transmitted through the virtual lanes by grouping the plurality of blocks into one or more clusters based on the corresponding physical memory address mapped to the plurality of blocks.

7. The SAS controller as claimed in claim 6, wherein the metadata associated with each of the plurality of blocks comprises at least one of a destination memory address for storing each of the plurality of blocks.

8. The SAS controller as claimed in claim 6, wherein the predetermined analysis techniques further comprise linear regression analysis.

9. The SAS controller as claimed in claim 6, wherein to transmit the plurality of blocks through the virtual lanes, the processor is configured to assign a virtual lane for each of the one or more clusters for transmitting the plurality of blocks in the one or more clusters.

10. The SAS controller as claimed in claim 6, wherein the processor is further configured to move the virtual lanes into a passive state upon completing transmission of each of the plurality of blocks.

11. A non-transitory computer readable medium including instructions stored thereon that when processed by at least one processor cause a Serially Attached Small Computer System Interface (SAS) controller to perform operations comprising:

receiving a plurality of Input/Output (I/O) operations, related to transmission of data, from a storage unit;

fragmenting each of the plurality of I/O operations into a plurality of blocks based on size of each of the plurality of I/O operations, wherein each of the plurality of blocks are stored in a cache memory, associated with the SAS controller, along with a corresponding logical memory address;

mapping the corresponding logical memory address of each of the plurality of blocks with a corresponding physical memory address of one or more memory drives for storing the plurality of blocks, wherein the mapping is based on metadata associated with each of the plurality of blocks;

determining, by the SAS controller, a predicted value of target transmission speed (Y) required by virtual lanes to transmit the plurality of blocks to corresponding one or more memory drives, by performing multi-linear regression on latencies $(X_0\_X_i)$ and transmission speed $(Y_0\_Y_i)$ in the virtual lanes for blocks that are already transmitted, wherein determining the predicted value of target transmission speed (Y) is based on the below equation:

$Y=\text{alpha}+\text{beta}(X)$, wherein, $$\text{Slope (beta)} = \frac{\text{Sum}(XiYi) - n(Xavg \cdot Yavg)}{\text{Sum}(X2) - n(Xavg)},$$

and $\text{alpha}=Y_{avg}-\text{beta}(X)$, wherein the Xavg·Yavg are the averages of X and Y by summing all the values and then dividing by number of values added;

estimating a minimum number of virtual lanes required for transmitting the plurality of blocks to corresponding one or more memory drives by performing a logistic regression analysis on the size of each of the plurality of blocks, the predicted value of transmission speed required by the virtual lanes, and number of the plurality of I/O operations pending for the transmission; and creating the minimum number of virtual lanes for transmitting each of the plurality of blocks to the one or more memory drives, and wherein the plurality of blocks are transmitted through the virtual lanes by grouping the plurality of blocks into one or more clusters based on the corresponding physical memory address mapped to the plurality of blocks.

* * * * *